Figure 1:
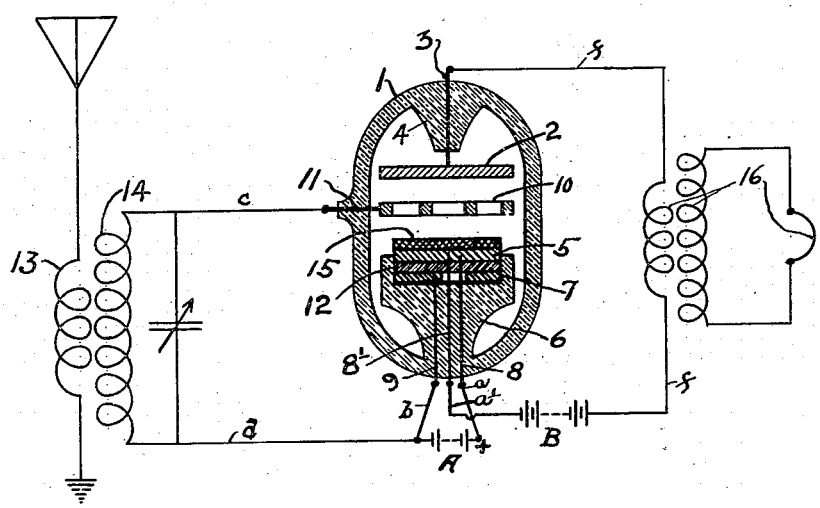

Dec. 7, 1937.   M. J. HUGGINS   2,101,068
METHOD OF AND MEANS FOR CONTROLLING THE FLOW OF ELECTRIC CURRENT
Filed July 12, 1935

INVENTOR-
M. J. Huggins
BY John O. Seifert
ATTORNEY-

Patented Dec. 7, 1937

2,101,068

UNITED STATES PATENT OFFICE 2,101,068

METHOD OF AND MEANS FOR CONTROLLING THE FLOW OF ELECTRIC CURRENT

Merion J. Huggins, Upper Saddle River, N. J.

Application July 12, 1935, Serial No. 30,963

5 Claims. (Cl. 250—27)

This invention relates to the controlling of the flow of constant direct current electric energy, the present application being a continuation in part of my application Serial No. 428,608, filed February 15, 1930.

It is the principal object of the invention to provide a new and improved method of and means for conforming the flow of constant direct current electric energy to the modulations and variations of a co-acting high frequency alternating electric current and to effect the modulation, amplification and rectification of high frequency alternating electric currents and the production of high frequency electric oscillations.

The invention is concerned with a type of apparatus involving controlled conduction of direct current electric energy through space by the singular means of electrically charged atoms of a gaseous medium that are normally chemically accumulated at or occluded by one electrode, which atoms, when electrically charged, are held in suspension at said electrode by the forces of chemical affinity attraction and electrostatic repulsion, and is also concerned with a type of apparatus involving controlled conduction of direct current electric energy through space by the dual means of electrically charged atoms of a gaseous medium that are normally chemically accumulated at or occluded by one electrode, which atoms, when electrically charged, are held in suspension at said electrode by the forces of chemical affinity attraction and electrostatic repulsion and an atomic conductor of electrically controllable electric conductivity or electric resistance.

It is an object of the invention to provide a new and improved method of and means for variably varying the flow or watt value of a constant flow of direct current electric energy conformably with variations and modulations in a co-acting high frequency alternating electric current by means of electrically charged current carrying elements or gas atoms electro-chemically accumulated at or occluded by an electrically charged electrode and electrically charged and held in suspension at said electrode by the forces of chemical affinity attraction and electrostatic repulsion.

It is an object of the invention to control the flow of direct current electric energy conformably with variations and modulations in high frequency alternating electric current by means of a plurality of fixed electrically chargeable elements and electrically chargeable gas atoms and varying the current carried or transferred between two fixed elements by the current carrying atoms by means of a relatively disposed varying electrostatic influence.

It is an object of the invention to provide a new and improved method of and means for varying a constant flow of direct current electric energy conformably with variations and modulations in a co-acting high frequency alternating electric current by polarizing the conducting circuit of said constant flow of direct electric current by interposing in said circuit, a plurality of fixed electrically chargeable elements and an atomic conductor of variable conductivity or resistance, and the provision of means to simultaneously conformably vary the electric conductivity or resistance of the atomic conductor and the electric energy carrying capacity of an electrically charged current carrying atom.

It is an object of the invention to provide a new and improved method of and means for variably varying the flow of watt value of a constant flow of direct current electric energy conformably with variations and modulations in a co-acting high frequency alternating electric current by effecting the variable transfer of said constant flow of direct electric current through space by subjecting an electrically charge current carrying element or gas atom to a plurality of constant positive electric charges and electrostatic fields and a relatively disposed varying electrostatic field.

In carrying out the invention a pair of electrodes are spaced apart in a sealed dielectric vessel which is charged with a requisite quantity of a gaseous electric conducting medium, in the present instance oxygen gas, and each electrode is adapted to be electrically charged. One electrode only has oxidizable characteristics and the inherent quality or property of accumulating or occluding the said oxygen gas atoms thereat through the attractive force of collective affinity. The electric current conduction between said electrodes is effectively controlled by electric charges on a third relatively disposed non-oxidizable electrode element, which charges effect a controlling influence on the movement of the electrically charged electric current carrying oxygen atoms in their current carrying transit from one of said pair of electrodes to the other, and also effect in the embodiment of Figure 1 a simultaneous controlling influence on the electric conductivity or resistance of the atomic conductor structure at one electrode.

Figure 2:
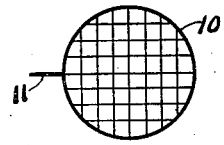
Figure 3:
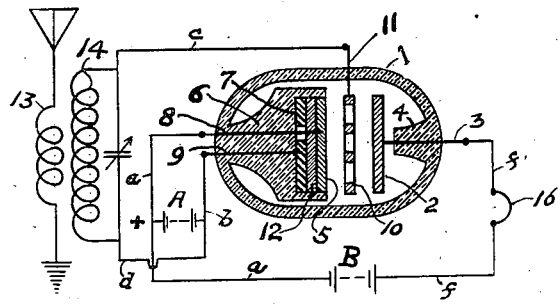

In the drawing accompanying and forming a part of this application, there is an adaptation of the invention in a commercial use, wherein Figures 1 and 3 are longitudinal sectional views of a device embodying the means of and for carrying out the method of the present invention, and showing diagrammatically the electrical connections of the electrode elements thereof with sources of constant direct current electric energy and the antenna of a radio frequency electric circuit; and Figure 2 is a front elevation of a modified form of the third electrically charged electrode element disposed relatively to the pair of electrodes.

In the illustrated embodiment of the invention a gaseous medium with a prerequisite oxygen gas atom content, is sealed in a vessel 1 of glass or other dielectric material. A plurality of electrically chargeable electrode elements are mounted in said vessel in fixed predetermined spaced relation. One of the fixed electrode elements, shown in the form of a disk 2 of non-oxidizable metal or material, is supported in said vessel by a conductor member 3 sealed in a post or pillar 4 and extending from the exterior to the interior of said vessel. A primary fixed electrode element is arranged in opposed and spaced relation to element 2 and shown in the form of a disk 5 mounted in a recess in the end of a dielectric pillar 6 arranged within the vessel at the end opposite the pillar 4. Another fixed electrode element in the form of a metal disk 7 is also mounted in the recess in the end of the pillar 6 beneath the primary electrode disk 5 and electrically insulated in spaced relation to the disk 5 by an interposed disk of dielectric material 12. The electrode element 5 in Figure 1 is of a metal, alloy, compound or material which has the inherent property or requisite quality of accumulating thereat or occluding the oxygen gas atoms in said vessel through the attractive force of collective affinity.

The fixed elements 5 and 7 are electrically connected to conductors 8 and 9, respectively, extended through and sealed in the post or pillar 6 and adapted for connection of electric conductors exterior of the vessel 1.

A third fixed element 10 which may comprise a perforated or articulated disk, as shown in Figure 1, or may be in the nature of a screen, as shown in Figure 2, is made of non-oxidizable material and as shown is supported in predetermined spaced or relative relation to the elements 2 and 5 by a member 11 of conducting material extended through and sealed in the wall of vessel 1 and adapted for connection of an electric conductor exterior of the vessel 1. However it is not absolutely necessary that the element 10 be disposed between the cathode and anode.

After elements 2, 5, 7 and 10 are assembled in the vessel, the vessel is evacuated of residual and occluded gases to the highest degree and vacuum practicable and oxygen, or other suitable gaseous medium with a requisite oxygen component, is admitted into the vessel. The admitted oxygen gas accumulates at, condenses on or is otherwise occluded by the electrode element 5 by the attractive force of the chemical affinity of the gas for the element 5, after which the vessel may again be evacuated to remove any excess oxygen and establish the necessary vacuum. The amount of gas admitted into the vessel and chemically accumulated and isolated at electrode 5 is an amount sufficient for the transfer of the maximum amount of electric energy between electrodes 2 and 5, and, as in Figure 1, for the composition of an atomic conductor at electrode 5, shown in a conventional manner at 15, and the amount of gas admitted and that accumulates at electrode 5 and in the atomic conductor is always in sub-mono-valent proportion to the mass atoms of said electrode and fractional in number to the total number of atoms in the mass of electrode 5 or a proportion corresponding to a very low sub-oxide.

In the embodiments of Figures 1 and 3, a source of constant electric energy, shown in a conventional manner at A, has its positive terminal connected by a conductor $a$ to element 5 through conductor 8 extended through a large perforation in metal disk 7 and through the insulating disk 12. The negative terminal of said source is connected by conductor $b$ to element 7 through conductor 9. One terminal of the secondary coil 14 of a source of high frequency alternating electric energy is connected to electrode 10 by conductors $c$ and 11, the other terminal of said secondary coil 14 being connected to element 7 by conductor $d$ through conductors $b$ and 9, and is also connected with element 5 through current source A and conductors $a$ and 8.

In Figure 3 a source of constant electric energy, shown in a conventional manner at B, has its negative terminal connected to element 5 by conductor $a$ through conductor 8, and in Figure 1 said terminal is connected to element 5 by conductor $a'$ through conductor 8', and in both Figures 1 and 3 the positive terminal of source B is connected to element 2 by conductor $f$ through an output device 16 and conductor 3, said output device being interposed in circuit with source B and element 2.

The electrical potential of the respective current sources A and B are adjusted to dispose a constant potential across electrodes 2 and 5 sufficient to effect the current carrying transit of the electrically charged oxygen atoms between electrodes 2 and 5 so that a constant positive electric charge is impressed on element 2 at a potential somewhat higher than the potential of the constant positive charge impressed on element 5. The potential of electrode 10 is such as will either accelerate or impede the response of the electrically charged current carrying atoms to the potentials of electrodes 2 and 5. It is obvious that element 10 can also be constantly positively electrically charged, and that any desired constant potential difference may be maintained between the elements 2 and 5, or 2, 5 and 10.

In the embodiment of the invention as illustratively disclosed in Figure 1, the electrode element 5 is made of a metal having a requisite affinity for oxygen gas atoms, or for the electrically chargeable atoms of the gaseous element, and in this instance is of such metals, alloys or compounds as aluminum or magnesium having a pronounced affinity for oxygen atoms. The elemental metallic nature of electrode 5 is such that the chemical action thereon of the oxygen gas, or gaseous medium, and the electric energy discharged from element 2 into element 5 effects an electrochemical disintegration and dissociation of metal atoms from the surface of the metal element 5 and causes said atoms to form at or upon element 5, and between element 5 and element 2, a diaphragmatic metal atom conductor structure or compound, as shown in a conventional manner at 15, comprising dissociated electric conducting metal atoms and oxygen gas atoms which firmly combine with the metal atoms in this initial formation of the atomic conductor structure through the natural force of the affinity of the metal atoms for the gas atoms.

In the embodiment of the invention illustratively disclosed in Figure 3, which is a reproduction of Figure 1 of my application Serial No. 428,608, the oxygen gas atoms in the vessel 1 accumulate at and on, or, in other words, condense on, electrode 5, through the attractive force of chemical affinity of the gas for the electrode 5. When electrode 5 is electrically charged the oxygen gas atoms accumulated and isolated thereat are electrically charged and repelled and are held in suspension at said electrode by the forces of chemical affinity attraction and electrostatic repulsion, and a suitable electric charge on electrode 2 will cause the electrically charged suspended oxygen atoms to transit between and discharge electric energy from electrode 2 to electrode 5.

In the embodiment of Figure 1, the electric conductivity of the atomic conductor at element 5, in which the oxygen atoms are in part firmly held and in part loosely held in combination with the metal or metal atoms is varied by the electrostatic influence of the electric charges on element 10, which electric charges de-oxidizes the atomic conductor by effecting an emission of the loosely held gas atoms, from said atomic structure and a decrease in the resistance or increase in the electric conductivity of the atomic conductor at element 5 proportional to said charges and de-oxidization.

In the embodiment of Figure 1 some of the oxygen atoms that are held in combination with the metal atoms of the atomic conductor 15 by the force of chemical affinity are electrostatically emitted from the atomic conductor and repelled by a positive electric charge on electrode 5 and are held in suspension in the region of electrode 5 by the attractive force of chemical affinity and the repelling force of the equal electric charge of the electrode and atom. The accumulation of the oxygen atoms at electrode 5 and in the atomic conductor constitutes oxidization of the atomic conductor and the electrostatic emission of said gas atoms from the atomic conductor constitutes de-oxidization.

When electrode 5 is electrically charged the oxygen atoms accumulated thereat become electrically charged at like potential, and, in accordance with the law of like charged bodies, are repelled, emitted from and held in suspension at electrode 5 by chemical affinity attraction and there is thus initiated electrostatic repulsion and de-oxidization of electrode 5 in Figure 3 and of electrode 5 and atomic conductor 15 in Figure 1. The potential of these electrically charged atoms is lower than the potential of electrode 2 and these atoms, obeying the law of unlike charged bodies, are attracted to and charged at the potential of electrode 2 and are repelled in accordance with the law of like charged bodies. The potential of the atom is now higher than the potential of electrode 5 and the atoms, again obeying the law of unlike charged bodies, are attracted to and discharge electric energy into electrode 5 until the potential of the atom equals that of electrode 5 when the atom is again repelled. In Figure 1 the high potential atom discharges its electric energy charge into electrode 5 through the atomic conductor 15 and thus the amount of electric energy discharged by the atoms from electrode 2 to electrode 5 will be proportional to the potential and number of atoms transiting as current carriers per unit of time and the conductivity or resistance of the atomic conductor 15. Whereas, in Figure 3 the amount of electric energy discharged by the atoms from electrode 2 to electrode 5 will be proportional to the potential and number of atoms transiting as current carriers per unit of time.

In Figure 1 the element 10 disposed at the side of the atomic conductor 15 opposite the element 5 and relatively between the atomic conductor and element 2, when variably electrically charged from the secondary 14, disposes a varying electrostatic force opposite the electrostatic force of the charge on element 5, which proportionally variably counteracts the chemical affinity attractive force at element 5 and electrostatically effects a proportionate varied emission from and de-oxidization of the element 5 and atomic conductor 15, the atomic conductor structure 15 thereby variably de-oxidizing the atomic conductor decreasing the dielectric oxygen atom content and increasing the conductivity, or decreasing the resistance, of the atomic conductor and the amount of current dischargeable therethrough, conformably with the electric charges on element 10.

The constant operating conductivity of the atomic conductor 15 and constant carrier current discharge in Figure 1 is established by the de-oxidizing effect of a constant electric charge on element 2 and this constant conductivity and carrier current discharge is further increased and varied by the de-oxidizing effect on element 15 of the electric charges on element 10 co-acting with the constant electric charge on element 2, and in Figures 1 and 3 said electric charges on element 10 also simultaneously and in like varied proportion increase the amount of electric energy being carried from element 2 to element 5 by de-oxidizing electrode 5 in Figure 3 and electrode 5 and atomic conductor 15 in Figure 1 and adding to the constant number of oxygen atom carriers certain of the atoms held in suspension in the region of element 5 which resist the singular attractive force of the positive charge on element 2 but respond to the nearer attractive influence of the electric charges on element 10 and have impetus or momentum imparted thereto to start them in a direction of travel toward element 2 and add these atoms to the constant number of atom electric current carriers in transit between elements 2 and 5 and thereby proportionally variably increase the amount of electric energy so carried or transferred conformably with the charges on element 10. Thus in the embodiment of Figure 1 the electrostatic field of the electric charges on element 10 simultaneously effects a like and conforming varied increase in the conductivity of the atomic conductor, and in the embodiments of both Figures 1 and 3 effect or induce a like variation in the electric current transferred by the electric current carrying element and the electric energy discharge through the circuit of current source B conformably with the electric charges on element 19.

The invention of the present application discloses the elemental nature of an atomic conductor and an electro-chemical method for composing an atomic conductor and disposing it in an electric current conducting circuit, and also discloses the elemental nature of an adaptable gaseous electric current carrying medium and an adaptable dielectric or gaseous component of an atomic conductor, as well as means for producing and adjusting the electro-potentials and accelerating electromotive forces, but the invention is not liimted thereto or thereby, or to the disclosed method of producing an atomic conductor or disposing an atomic conductor in an electric conducting circuit, or the elemental nature, size, shape or relative position of the electrode elements, except as said invention may be limited in scope by the appended claims.

Having thus described my invention, I claim:

1. The method of controlling the transfer of electric energy through space, comprising providing an evacuated vessel having sealed therein oxygen gas and a plurality of electrically chargeable electrode elements including an oxidizable electrode element at which the gas is accumulated and electro-chemically effecting oxidization of said electrode and the composition of an oxygenic atomic conductor at the oxidizable electrode and another of said electrode elements co-operating with the oxidizable electrode element, initiating de-oxidization of the oxidizable electrode element and atomic conductor and emission of oxygen atoms therefrom by an electric charge on said oxidizable electrode element, effecting the emission of oxygen from and a degree of de-oxidization and electric conductivity of the atomic conductor and the discharge of a constant carrier current between said electrodes by said emitted atoms by an electric charge on the co-operating electrode element, and effecting an increase in the emission of oxygen atoms from and the de-oxidization and electric conductivity of the atomic conductor and electric energy discharge to vary the electric energy discharge between the oxidized and co-operating electrode elements by and conformably with an electric charge on a third of said electrode elements.

2. In means for effecting varied transfer of constant electric energy through space, an evacuated sealed vessel charged with oxygen gas, an oxidizable electrode element and a co-operating electrode element fixed in said vessel adapted to be constantly electrically charged at different potentials, said oxygen gas accumulating at and co-acting with the oxidizable electrode element to oxidize said electrode element and compose an oxygenic atomic conductor at said electrode, the electric charge on said oxidizable electrode element initiating de-oxidization of said electrode element and atomic conductor, and the electric charge on the co-operating electrode element effecting emission of oxygen atoms from and de-oxidization of the oxidizable electrode element and atomic conductor and the discharge of electric energy between said electrode elements proportional to said atom emission and electric conductivity of the atomic conductor, and a third electrode element in the vessel adapted to be electrically charged and the electric charge thereon co-acting with the charge on the co-operating electrode element to vary the conductivity of the atomic conductor and current discharge conformably with the electric charge on said electrode element.

3. In effecting and varying the transfer of constant electric energy through space, comprising the method of providing an evacuated sealed vessel charged with oxygen gas, and an oxidizable electrode element and a co-operating electrode element fixed in said vessel, and the oxidizable electrode element having the property to cause the oxygen gas to accumulate at the oxidizable electrode element through the force of chemical affinity and co-acting therewith to oxidize and compose an oxygenic atomic conductor at said electrode element, initiating de-oxidization of said oxidizable electrode element and atomic conductor and effecting emission of oxygen atoms from and the de-oxidization of the de-oxidizable electrode element and electric conductivity of the atomic conductor and discharge of constant electric energy between said de-oxidizable and co-operating electrode elements proportional to the emitted oxygen atoms transiting as current carriers and the conductivity of the atomic conductor by electric charges of differential potential on said electrode elements, and effecting varied de-oxidization and emission of oxygen atoms from the atomic conductor and variable discharge of electric energy between said electrode elements by and conformable with the modulation and potential of a co-acting electric charge.

4. The effecting of varied transfer of constant electric energy through space, consisting in providing an evacuated vessel having sealed therein a pair of co-acting electrode elements, a third electrode element and a gaseous medium, and one of said pair of electrode elements having the property to cause the gaseous medium to accumulate at and coact with said electrode element and compose an atomic conductor at said electrode element, effecting an emission and electric charging of gas atoms from said electrode and atomic conductor and discharge of electric energy between said pair of electrode elements by said emitted and electrically charged atoms by electrically charging said latter electrode element and atomic conductor and the other of said pair of electrode elements, and controlling the emission of said gas atoms and discharge of electric energy by and in conformity with an electric charge on the third electrode element.

5. A detector and amplifier of oscillating electric currents, comprising an evacuated sealed vessel carrying therein an electrode charged with a gaseous element accumulated at said electrode by chemical affinity and a co-operating electrode chemically inert to said gaseous element, said electrodes being adapted for connection in an output circuit with a source of electric energy to electrically charge said electrodes and effect an emission of the gaseous element from said gas charged electrode and discharge of electric energy between said electrodes, and means adapted to be charged by oscillating electric current and conformably therewith vary the emission of the gaseous element from the one electrode and discharge of electric energy between the electrodes.

MERION J. HUGGINS.